United States Patent [19]

Canella et al.

[11] Patent Number: 4,551,335
[45] Date of Patent: Nov. 5, 1985

[54] FERMENTED SUNFLOWER MEAL AND THE METHOD FOR ITS PREPARATION

[75] Inventors: Marco Canella, Rome; Daniele Marghinotti, Capena; Adriano Bernardi, Monterotondo; Giancarlo Sodini, Grottaferrata, all of Italy

[73] Assignee: E.N.I. Ente Nazionale Incorporated, Rome, Italy

[21] Appl. No.: 480,835

[22] Filed: Mar. 31, 1983

[30] Foreign Application Priority Data

May 27, 1982 [IT] Italy .............................. 21513 A/82

[51] Int. Cl.$^4$ .............................................. A23L 1/36
[52] U.S. Cl. ........................................ 426/44; 426/49
[58] Field of Search ........................................ 426/44

[56] References Cited

U.S. PATENT DOCUMENTS 3,803,328 4/1974 Staron .................................. 426/44

OTHER PUBLICATIONS

DiMaggio et al.–Chem. Abst., vol. 98 (1983) p. 124,532t.

Primary Examiner—Sam Rosen
Attorney, Agent, or Firm—Hedman, Gibson, Costigan & Hoare

[57] ABSTRACT

A new protein product, namely fermented sunflower meal, prepared by the lactic fermentation of de-oiled meal originating from sunflower seeds, and characterized, in comparison with the starting material, by better chemical, physical and nutritional properties, such as increased protein solubility, a lower level of chlorogenic acid, the phenolic pigment responsible for darkening the meal, the absence of fermentable sugars (raffinose), and a higher content of lysin, the main limiting amino acid of the sunflower. The lactic fermentation, which is not spontaneous for sunflower meal in water, as in the case of various cereals, is developed by suitably acidifying an aqueous suspension of meal and allowing it to incubate for some days.

4 Claims, No Drawings

FERMENTED SUNFLOWER MEAL AND THE METHOD FOR ITS PREPARATION

Besides representing an effective means for preserving foodstuffs, fermentation modifies their original characteristics by the action of micro-organisms and their enzymes, to often improve the acceptability, odour, taste and nutrient value of the foodstuffs concerned. Of the various fermented products, protein products, play a significant role, these in western countries being mainly of animal origin (cheeses, sausages, various meats), whereas in eastern countries they originate from vegetables, in particular soya and certain cereals.

For example, in Asia the unpleasant original taste of soya and the presence of antinutritional factors have been overcome for centuries by fermentation processes. Some American researchers have studied and modified the conventional soya fermentation processes by carrying out wide research on various products (Hang, Y. D. Jackson, H. Food Technol. 21, 95, 1967; Hesseltine, C. W. et al., Develop Ind. Microbiol. 8, 179, 1967; Wang. H. L. et al., J. Nutr. 96, 109, 1968), but the fermentation path has been little experimented in the case of other oleaginous products, in contrast to cereals and certain legumes, of which the nutrient value has been considerably increased by this treatment (Hamad, A. M., Fields, M. L. J. Food Sci. 44, 456, 1979; May-Gi Lay, M. Fields, M. L. J. Food Sci. 46, 1069, 1981; Au P. M., Fields, M. L. J. Food Sci. 46, 652, 1981; Sathe, S. K., Salunkhe, D. K. J. Food Sci. 46, 1374, 1981; Tongnual, P. et al., J. Food Sci 46, 100, 1981). Research carried out some years ago in France described a method for producing colza proteins by fermentation (Staron, T. Les Ind. de l'alim. anim. 9, 36, 1974). This method dispensed with the techniques used up to that time for extracting toxic compounds such as thioglucosols and isocyanates, these being simply hydrolysed and degraded by the fermentation process (Staron, T., Riv. It. Sostanze Grasse, 51, 225, 1974).

This invention describes the preparation and chemical and nutritional characteristics of a new protein product indicated in the text as fermented sunflower meal, which is obtained by the heterolactic fermentation of de-oiled meal by acidifying the aqueous suspension. In this respect, when suspended in water, sunflower meal does not undergo natural lactic fermentation because of the extremely low lactobacilli content, but becomes rapidly contaminated due to the growth of moulds and enterobacteriaceae, in contrast to many cereals, of which the meal when mixed with water ferments naturally with the growth of lactobacillaceae (Fields, M. L. et al., J. Food Sci. 46, 900, 1981; Kazanas, N., Fields, M. L. J. Food Sci. 46, 819, 1981; Frazier, W. C. in "Food Microbiology" 236, McGraw-Hill Book Co. Inc. N.Y. 1958).

However, by adjusting the pH of the aqueous suspension by adding inorganic or organic acids (hydrochloric acid, citric acid, tartaric acid) to within the pH range between 4.0 and 5.5 and then allowing it to incubate within a temperature range of between 30° and 40° C., it has been surprisingly observed that lactic fermentation takes place, triggered by the acid environment which allows rapid development of the few lactobacilli present, which after only 24 hours of incubation become the predominant microbic flora, with progressive disappearance of the yeasts and moulds found in the initial meal. Fermented sunflower meal has a chemical composition similar to the starting material, but possesses nutritional characteristics which are improved because of the higher content of certain essential amino acids traditionally lacking in the sunflower (lysin, cystine, phenylalanine), because of the reduction in the levels of chlorogenic acid, the main polyphenolic pigment responsible for the undesirable coloration of the meal at alkaline pH values (Cater, C. M. et al., Cereal Chem. 49, 508, 1970), and because of the disappearance of raffinose, the only fermentable sugar in the sunflower.

Numerous methods have been proposed for removing chlorogenic acid from almonds and sunflower meal, some using organic solvents such as 70% ethanol (Smith, A. K., Johnsen, V. L., Cereal Chem. 25, 399, 1948; Joubert, F. J., Biochim. Biophys. Acta 16, 520, 1955; Milic, B. et al., J. Sci. Fd. Agr. 19, 108, 1958; Fan. T. Y. et al., Cereal Chem. 53, 118, 1976), aqueous methanol (Smith, A. K., Johnsen, V. L., Cereal Chem. 25, 399, 1948) or acid butanol (Sodini G., Canella M., U.S. Pat. No. 4,072,671, Feb. 7, 1978; J. Agric. Food Chem. 25, 822, 1977) whereas others use saline solutions such as sodium sulphite (Gheyasuddin, S. et al., Food Technol. 24, 242, 1970) and sodium chloride (Sastry. M. C. S. M. Sc. Thesis, University of Mysore, India 1979) or acid diffusion (Sosulski, F. W. et al., J. Food Sci. 37, 253, 1972) or ultrafiltration (Culioli, J., Maubois, J. L. Rev. Fr. Corps Gras, 10, 521, 1975).

The removal of the chlorogenic acid often led to partial extraction of the oligosaccharides (Sodini, G., Canella, M., U.S. Pat. No. 4,072,671, Feb. 7, 1978; Canella, M., Sodini, G., J. Food Sci. 42, 1218, 1977; Lanzani, A. et al., Riv. It. Sostanze Grasse 56, 48, 1979) which lowered the raffinose levels in the meal. From these aspects, lactic fermentation can represent an original, simple and effective method for removing the undesirable constituents of sunflower meal by reducing the chlorogenic acid content and eliminating the fermentable sugar fraction. The sunflower meal obtained by the fermentation process can be used as a fortifying agent in bread and in oven products generally, in the preparation of protein-enriched snacks and in various dietetic formulations for the better nutrient content compared with conventional meal. Furthermore, because of the increased protein solubility, fermented sunflower meal can find interesting application in all those formulations requiring highly soluble ingredients, such as instant soup preparations, dietetic drinks, fruit purees and special products for infants.

SUNFLOWER MEAL FERMENTATION

Drinking water was added to the de-oiled sunflower meal in various solid/liquid proportions, the resultant suspension was acidified to different pH values with the desired acid, and was left to incubate for 3 days at a temperature of between 30° and 40° C. Samples of the meal were taken initially, and after 24, 48 and 72 hours in order to effect the microbiological count at various stages of the fermentation process. From these samples it was found that the predominant bacterial flora in the sample after only 24 hours was lactobacillaceae (gram. positive microaerophilic rods of negative catalysis).

At the end of the third day of fermentation, the aqueous sunflower meal suspension was lyophilised. The resultant product is indicated in the text as fermented sunflower meal.

TITRATABLE ACIDITY

The method employing p-hydroxydiphenyl and sulphuric acid was used for determining the presence of lactic acid, and the lanthanum nitrate and iodide test was used for identifying acetic acid (Feigh, F., "Spot Tests in Organic Analysis" p. 454, Elsevier Pub. Co. N.Y., 1966).

CHEMICAL ANALYSIS

Moisture, lipids, ash and raw fibre were determined in samples of fermented sunflower meal, and of the meal as such, using the standard methods of A.O.A.C. (Association Official Analytical Chemists, 12th Ed. 1975). The protein content was expressed as Kjeldahl nitrogen $\times 5.70$. The total sugars were calculated by the method of Dubois, M. et al., (Anal. Chem. 28, 350, 1956). The phenols and oligosaccharides were determined as trimethylsilyl derivatives by gas chromatography in accordance with Sabir, M. A. et al., (J. Agr. Food Chem. 22, 572, 1974; J. Agr. Food Chem. 23, 16, 1975), using an HP 5840 A gas chromatograph with a 5840 GC automatic integrator. These compounds were extracted for gas chromatography analysis by the method of Dubois M. et al., (Anal. Chem. 28, 350, 1956).

The amino acids were analysed by the method of Spackman, D. H. et al., (Anal. Chem. 30, 1190, 1958) using a Beckman autoanalyser mod. 120 C. The cystine and methionine were calculated in accordance with the method of Moore, S. (J. Biol. Chem. 238, 235, 1963). The tryptophan was determined by the method of Knox, R. et al., (Anal. Biochem. 36, 136, 1970).

NITROGEN SOLUBILITY

The nitrogen solubility values were obtained by the method of Gheyassudin, S. et al., (Food Technol. 24, 242, 1970). Samples of 1 g of fermented sunflower meal and of the meal in its original state were extracted in 50 ml of 1N NaCl of pH 7.0 or of an aqueous NaOH solution of pH 9.0 for 1 hour at ambient temperature. The extracts were centrifuged at 27,000 g for 20 minutes at 10° C., filtered through a Whatman No. 3 filter paper, and subjected to Kjeldahl nitrogen analysis.

MICROBIOLOGICAL ANALYSIS

The microbiological tests on the sunflower meal samples before and after fermentation were carried out by the methods described by Mossel P. A. A. and Tamminga S. K. in "Methoden Voor Het Microbiologisch Onderzeck Van Levensmiddelen" Uitgeverij B. V. Nordervliet P. C., Zeist., 1973. The classification of the lactobacillaceae, the predominant microflora in fermented sunflower meal, was carried out in accordance with Bergey's Manual of Determinative Bacteriology, 8th Ed., The Williams & Wilkins Company, Baltimore, 1974.

EXAMPLES

The details will be apparent from reading the following examples, which are merely to illustrate the invention, without limiting its scope.

EXAMPLE 1

Lactic Fermentation of Sunflower Meal Prepared in the Laboratory 75 g of sunflower meal, prepared in the laboratory by using n-hexane to extract the oil from totally decorticated seeds of the Albinia variety, were suspended in 300 ml of drinking water (proportions 1:4, weight-/volume). The spontaneous pH of the mixture, which was 6.2, was adjusted to 4.6 by adding hydrochloric acid, and the suspension was allowed to incubate for 3 days in an oven temperature-controlled at 37° C.

During the process, samples were withdrawn from the initial meal at time 0 and after 24, 48 and 72 hours of fermentation, for the acidity tests and microbiological analysis. At the end of the third day, the product known as fermented sunflower meal was recovered by lyophilisation. The tests with p-hydroxydiphenyl/sulphuric acid and lanthanum nitrate/iodide, which were positive for lactic acid and acetic acid from the first day of fermentation, revealed the development of a heterolactic fermentation. Table 1 shows the microbiological count at various stages of the fermentation process.

TABLE 1

| Microbiological count effected on the laboratory-prepared sunflower meal during fermentation at 37° C. | | | | |
|---|---|---|---|---|
| | Sampling time (hours) | | | |
| Microbiological tests | 0 | 24 | 48 | 72 |
| Total aerobic count/g | $6 \times 10^4$ | $4 \times 10^3$ | $<100$ | $<10$ |
| Yeasts and moulds/g | $6 \times 10^3$ | $2 \times 10^3$ | $<10$ | $<10$ |
| Enterobacteriaceae/g | $<10$ | $2 \times 10^2$ | $<10$ | $<10$ |
| Lactobacillaceae/g | $<100$ | $2 \times 10^8$ | $2 \times 10^9$ | $3 \times 10^9$ |
| Suspension pH | 4.6 | 4.4 | 4.2 | 4.1 |

The starting material, i.e. the laboratory-prepared sunflower meal, showed a total aerobic count of $6 \times 10^4$/g, a yeast and mould content of $6 \times 10^3$/g, and no coliform contamination (enterobacteriaceae $<10$ g), whereas the lactobacillaceae were present in extremely low quantity ($<100$/g).

In the sample after 24 hours of fermentation there was a reduction in the total aerobic count ($4 \times 10^3$/g), a yeast and mould reduction ($2 \times 10^3$/g), a temporary increase in enterobacteriaceae ($2 \times 10^2$/g), and a considerable development of lactobacillaceae ($2 \times 10^8$/g), which already represented the predominant microflora. After 48 hours, the total aerobic count was irrelevant, and yeasts, moulds and enterobacteriaceae had disappeared, with a consequent increase in lactobacillaceae to a value of $2 \times 10^9$/g. In the final sample after 72 hours, the lactobacillaceae count was $3 \times 10^9$/g, with a zero aerobic count. During the entire fermentation process, the pH of the suspension had changed from 4.6 to 4.1.

Three lactobacilli, namely *L.brevis*, *L.cellobiosus* and *L.coprophilus* were isolated and identified in the fermented sunflower meal.

The most surprising aspect of this phenomenon was the possibility, by merely adjusting the pH of the initial meal and water suspension, of developing a lactic fermentation in the sunflower meal although it initially had an almost negligible level of lactobacillaceae ($<100$/g), in contrast to many cereals in which lactic fermentation in water takes place easily because of the significant presence of lactobacilli in the meal (Fields, M. L. et al., J. Food Sci. 46, 900, 1981; Kazana, N., Fields, M. L. J. Food Sci. 46, 819, 1981). The chemical composition of the initial sunflower meal and of the fermented product, together with their nitrogen solubility at pH 7.0 and pH 9.0 are shown in Table 2.

The protein, ash and raw fibre content did not vary significantly in the two samples examined, however a reduction in total sugars from 10.8% in the initial meal to 5.1% in the fermented sunflower meal is observed, due probably to the fermentation of the carbohydrates by the lactic bacteria heterofermenting with the production of lactic acid and acetic acid, as was demonstrated previously by the titratable acidity test.

The nitrogen solubility at pH 7.0 was higher in the fermented meal (83.5%) than in the initial meal (70.1%), which can suggest certain interesting applications of the fermented sunflower meal in dietetic milk foods, where high solubility of the product at neutral pH is required. The nitrogen solubility at pH 9.0 was slightly less in the fermented product (73.8%) than in the original laboratory-prepared meal (78.5%).

TABLE 2

Chemical composition and nitrogen solubility of the laboratory-prepared sunflower meal and of the fermented meal (g/100 g of dry substance)

|  | UNFERMENTED MEAL % | FERMENTED MEAL % |
| --- | --- | --- |
| Moisture | 11.9 | 3.9 |
| Proteins (N × 5.70) | 55.7 | 56.3 |
| Lipids | 0.7 | 2.3 |
| Ash | 7.1 | 7.1 |
| Raw fibre | 5.0 | 5.5 |
| Total sugars | 10.8 | 5.1 |
| Non-nitrogenated extracts (difference to 100) | 20.7 | 23.7 |
| Nitrogen solubility at pH 7.0 | 70.1 | 83.5 |
| Nitrogen solubility at pH 9.0 | 78.5 | 73.8 |

Table 3 shows the values resulting from the gas chromatography determination of phenols and oligosaccharides in the initial meal and in the fermented sunflower meal.

TABLE 3

Phenol and oligosaccharide composition of the laboratory-prepared sunflower meal and of the fermented meal (g/100 g of dry substance)

|  | UNFERMENTED MEAL % | FERMENTED MEAL % |
| --- | --- | --- |
| Chlorogenic acid | 7.24 | 3.49 |
| Caffeic acid | 0.23 | 0.87 |
| Quinic acid | 0.10 | 0.56 |
| Isoferulic acid | 0.11 | 0.37 |
| Glucose | 0.02 | 0.38 |
| Fructose | 0.27 | 0.42 |
| Saccharose | 6.86 | 0.06 |
| Raffinose | 3.31 | 0.08 |

Analysis of the phenolic pigments in the laboratory-prepared sunflower meal before and after lactic fermentation showed a decrease in chlorogenic acid of more than 50% (from an initial value of 7.24% in the meal to a level of 3.49% in the fermented product due to the hydrolysis of this compound into its two constituents, namely caffeic acid and quinic acid, which in fact increased after fermentation (see Table 3) but not to the same extent as that by which the chlorogenic acid decreased, because about one half of these two acids was metabolised by the lactic bacteria (Whiting G. C. in "Lactic Acid Bacteria in Beverages and Food" Ed. Carr, J. C., Cutting, C. V., Whiting, G. C., Acad. Press N.Y. p. 75, 1975).

The oligosaccharides present in the sunflower meal were almost completely converted into simple sugars by the lactobacilli, which are notoriously saccharolytic. In fact, the saccharose decreased from 6.86% in the meal to 0.06% in the fermented product, and the raffinose, the only fermentable sugar in the sunflower, decreased from 3.31% to 0.08%. This hydrolysis of the di and trisaccharides led to an increase in glucose (0.38%) and particularly in fructose (3.42%) in the fermented meal over the negligible levels of these carbohydrates in the initial meal.

The partial hydrolysis of chlorogenic acid and the total degradation of the raffinose represent an important result of the lactic fermentation process, because without adding chemical solvents or effecting special chemical and physical treatments such as gel chromatography and ultrafiltration, and merely by adding water to the sunflower meal, then acidifying and allowing it to incubate for some days, the quality of this product is improved, thus overcoming one of the main obstacles to the use of sunflower meal in various food formulations, even if only partially in the case of the chlorogenic acid.

Table 4 shows the total amino acid composition of the initial meal and of the fermented sunflower meal.

TABLE 4

Amino acid composition of laboratory-prepared sunflower meal and of fermented meal (g/16 g of nitrogen)

| Amino Acid | UNFERMENTED MEAL % | FERMENTED MEAL % |
| --- | --- | --- |
| Lysin | 3.5 | 4.3 |
| Methionine | 2.2 | 1.9 |
| Cystine | 2.0 | 2.4 |
| Phenylalanine | 4.2 | 4.8 |
| Tyrosine | 2.7 | 2.4 |
| Tryptophan | 1.6 | 2.0 |
| Isoleucine | 3.4 | 3.4 |
| Leucine | 5.8 | 5.7 |
| Threonine | 3.5 | 3.4 |
| Valine | 3.9 | 3.9 |
| Histidine | 2.3 | 2.4 |
| Arginine | 8.9 | 8.0 |
| Glycine | 5.1 | 5.2 |
| Serine | 4.4 | 4.2 |
| Alanine | 3.7 | 3.7 |
| Aspartic acid | 8.4 | 7.9 |
| Glutamic acid | 20.2 | 19.0 |
| Proline | 5.0 | 3.4 |
| Ammonia | 3.2 | 1.6 |

From the nutritional aspect the small increase in lysin in the fermented product (4.3%) over the initial meal (3.5%) appeared important, and the cystine was present in a higher quantity (2.4%) than in the initial material (2.0%), whereas the sulphonate levels were not greater overall in the fermented meal due to the reduction in the methionine (from 2.2 to 1.9%). The phenylalanine and tryptophan also benefited from the fermentation process, while the other amino acids maintained more or less comparable values, except the proline which was less after fermentation.

EXAMPLE 2

Lactic Fermentation of Sunflower Meal Produced in a Pilot Plant 300 ml of drinking water were added to 75 g of sunflower meal (proportions 1:4, weight/volume) originating from seed processing carried out in the pilot plant of Nera Montoro (Terni). The mixture was acidified to pH 4.6 with hydrochloric acid, and the suspension was allowed to incubate for 3 days in an oven at 37° C. Samples were taken initially and after 24, 48 and 72 hours for the acidity and microbiological tests during the fermentation process. After 72 hours of fermentation the suspension was lyophilised. The tests with p-hydroxydiphenyl/sulphuric acid and lanthanium nitrate/iodide were positive, showing the development of a heterolactic fermentation in the sunflower meal sample originating from the pilot plant.

Table 5 shows the microbiological count in the various samples.

TABLE 5

Microbiological count in the pilot plant sunflower meal during fermentation at 37° C.

| Microbiological tests | Sampling time (hours) | | | |
|---|---|---|---|---|
| | 0 | 24 | 48 | 72 |
| Total aerobic count/g | $6 \times 10^4$ | $6 \times 10^4$ | $8 \times 10^2$ | $9 \times 10^2$ |
| Yeasts and moulds/g | $10^3$ | $8 \times 10^2$ | $8 \times 10^2$ | $10^3$ |
| Enterobacteriaceae/g | $9 \times 10^2$ | $2 \times 10^3$ | <10 | <10 |
| Lactobacillaceae/g | <100 | $10^4$ | $7 \times 10^8$ | $3 \times 10^9$ |
| Suspension pH | 4.6 | 4.5 | 4.2 | 4.2 |

The sunflower meal produced by the pilot plant had a total aerobic count of $6 \times 10^4$/g, with a yeast and mould content of $10^3$/g, with the presence of coliform contaminance (enterobacteriaceae $9 \times 10^2$/g), whereas the lactic bacteria were at the usual very low level (<100/g) commonly found in samples of sunflower meal. The first 24 hours of fermentation produced a yeast and mould reduction ($8 \times 10^2$/g) and an enterobacteriaceae increase ($2 \times 10^3$/g) with a lactobacillaceae development of $10^4$/g. After the second day of fermentation the total aerobic count had decreased ($8 \times 10^2$/g), the yeasts and moulds remained unaltered, the enterobacteriaceae had disappeared, and the lactobacilli had reached a value of $7 \times 10^8$/g. In the final sample (72 hours) the total aerobic count was $9 \times 10^2$/g and the lactobacillaceae were present at the same level ($3 \times 10^9$/g) as the sunflower meal sample of example 1. In this case it should be noted that the lactic fermentation produces a decontaminating action on the pilot plant sunflower meal by eliminating the enterobacteriaceae within 48 hours of fermentation, after a temporary increase on the second day. The suspension pH varied from 4.6 to 4.2 during the process. Three species of lactic bacteria were isolated from the fermented product, namely *L.brevis*, *L.cellobiosus* and *L.coprophilus*.

The chemical composition and nitrogen solubility at pH 7.0 and 9.0 of the pilot plant sunflower meal, both in its original state and after fermentation, are shown in Table 6.

TABLE 6

Chemical composition and nitrogen solubility of the pilot plant sunflower meal before and after fermentation (g/100 g of dry substance)

| | UN-FERMENTED MEAL % | FERMENTED MEAL % |
|---|---|---|
| Moisture | 6.5 | 6.9 |
| Proteins (N × 5.70) | 54.0 | 54.1 |
| Lipids | 1.2 | 2.1 |
| Ash | 8.4 | 9.4 |
| Raw fibre | 4.7 | 5.2 |
| Total sugars | 11.0 | 10.9 |
| Non-nitrogenated extracts (difference to 100) | 20.7 | 18.3 |
| Nitrogen solubility at pH 7.0 | 68.7 | 87.1 |
| Nitrogen solubility at pH 9.0 | 81.5 | 89.1 |

The chemical composition of the initial meal and of the fermented product show no appreciable differences.

The nitrogen solubility at pH 7.0 in the fermented meal increases considerably (87.1%) compared with 68.7% in the initial meal). The nitrogen solubility at pH 9.0 also increases after fermentation (89.1% against 81.5%), whereas a slight reduction was observed in the laboratory-prepared meal (example 1).

Table 7 shows the gas chromatograph analysis for phenols and oligosaccharides before and after fermentation of the pilot plant sunflower meal.

The distribution of the phenolic compounds in the fermented meal showed a reduction in chlorogenic acid to a value of 2.19% from an initial value of 4.84%, with a simultaneous increase in caffeic acid (from 0.28% in the initial meal to 0.99% in the fermented product), in quinic acid (from 0.08% to 1.11%) and in isoferulic acid (from 0.32% to 2.07%). Likewise, the drastic reduction in saccharose (from 6.99% to 0.04%) and the disappearance of raffinose (2.98% in the initial meal) were accompanied by an increase in glucose (from 0.08% to 1.27%) and a more considerable increase in fructose (from 0.18% to 5.59%).

TABLE 7

Phenol and oligosaccharide composition of the pilot plant sunflower meal and of the fermented meal (g/100 g of dry substance)

| | UNFERMENTED MEAL % | FERMENTED MEAL % |
|---|---|---|
| Chlorogenic acid | 4.84 | 2.19 |
| Caffeic acid | 0.28 | 0.99 |
| Quinic acid | 0.08 | 1.11 |
| Isoferulic acid | 0.32 | 2.07 |
| Glucose | 0.08 | 1.27 |
| Fructose | 0.18 | 5.59 |
| Saccharose | 6.99 | 0.04 |
| Raffinose | 2.98 | <0.01 |

Table 8 shows the total amino acid composition of the sunflower meal produced by the pilot plant, and of the corresponding fermented meal.

TABLE 8

Amino acid composition of the pilot plant sunflower meal and of the fermented meal (g/16 g of nitrogen)

| Amino acid | UNFERMENTED MEAL % | FERMENTED MEAL % |
|---|---|---|
| Lysin | 3.3 | 5.0 |
| Methionine | 2.0 | 1.3 |
| Cystine | 1.8 | 2.8 |
| Phenylalanine | 4.1 | 4.4 |
| Tyrosine | 2.1 | 2.2 |
| Tryptophan | 1.5 | 1.8 |
| Isoleucine | 3.5 | 3.3 |
| Leucine | 5.6 | 5.1 |
| Threonine | 3.4 | 3.0 |
| Valine | 4.8 | 4.1 |
| Histidine | 2.4 | 2.2 |
| Arginine | 7.7 | 6.7 |
| Glycine | 5.6 | 4.6 |
| Serine | 4.1 | 3.5 |
| Alanine | 4.1 | 3.4 |
| Aspartic acid | 9.3 | 7.6 |
| Glutamic acid | 22.9 | 18.5 |
| Proline | 4.2 | 2.6 |
| Ammonia | 3.1 | 2.3 |

In the fermented pilot plant meal a significant increase is noted in the lysin content (from 3.3% in the unfermented sample to 5.0%) and in the cystine content (from 1.8% to 2.8%), together with a reduction in methionine (from 2.0% to 1.3%) and a slight increase in phenylalanine (from 4.1% to 4.8%). The tryptophan content also increased (1.8% compared with an initial 1.5%), whereas the most significant decreases in the product after fermentation where noted for the proline, glutamic acid and aspartic acid.

We claim:

1. A method for preparing fermented sunflower meal, consisting of activating the heterolactic fermentation of an aqueous suspension of the de-oiled sunflower meal by adjusting its pH to an acid value within the range of 4.0 to 5.5; and allowing the de-oiled sunflower meal to digest for three days at a temperature between 30° and 40° C. to allow for lactic acid bacteria fermentation with the subsequent removal of chlorogenic acid.

2. A method for preparing fermented sunflower meal as claimed in claim 1, characterized in that the acidification is effected by adding inorganic or organic acids to the aqueous suspension of the de-oiled meal.

3. A method for preparing fermented sunflower meal as claimed in claim 1, characterized in that the acidification is effected by adding inorganic or organic acids to the aqueous suspension of the de-oiled meal.

4. The fermented sunflower meal prepared by the method as claimed in any one of claims 1 to 3.

* * * * *